United States Patent
Chen et al.

(10) Patent No.: US 10,411,840 B2
(45) Date of Patent: Sep. 10, 2019

(54) METHODS FOR ENHANCED HARQ MECHANISM

(71) Applicant: MEDIATEK Singapore Pte. Ltd., Singapore (SG)

(72) Inventors: Hua-Min Chen, Beijing (CN); Feifei Sun, Beijing (CN); Xiangyang Zhuang, Lake Zurich, IL (US)

(73) Assignee: HFI Innovation INC., HsinChu (TW)

( * ) Notice: Subject to any disclaimer, the term of this patent is extended or adjusted under 35 U.S.C. 154(b) by 514 days.

(21) Appl. No.: 15/176,274

(22) Filed: Jun. 8, 2016

(65) Prior Publication Data

US 2016/0285594 A1    Sep. 29, 2016

Related U.S. Application Data

(63) Continuation of application No. PCT/CN2015/071721, filed on Jan. 28, 2015.

(30) Foreign Application Priority Data

Jan. 28, 2015    (WO) .............. PCT/CN2015/071721

(51) Int. Cl.
*H04L 1/16*    (2006.01)
*H04L 1/18*    (2006.01)
(Continued)

(52) U.S. Cl.
CPC .......... *H04L 1/1864* (2013.01); *H04L 1/1607* (2013.01); *H04L 1/189* (2013.01);
(Continued)

(58) Field of Classification Search
CPC ............... H04L 1/1864; H04L 5/0055; H04W 72/0413; H04W 72/042
See application file for complete search history.

(56) References Cited

U.S. PATENT DOCUMENTS

| 8,964,658 B2 | 2/2015 | Chen et al. ................ 370/329 |
| 2008/0065943 A1 | 3/2008 | Botha ........................ 714/748 |

(Continued)

FOREIGN PATENT DOCUMENTS

| CN | 102714580 A | 11/2009 |
| CN | 103283169 | 12/2010 |

(Continued)

OTHER PUBLICATIONS

International Search Report and Written Opinion of International Search Authority for PCT/CN2015/071721 dated Apr. 27, 2015(12 pages).

(Continued)

*Primary Examiner* — Derrick W Ferris
*Assistant Examiner* — Farhad Ali
(74) *Attorney, Agent, or Firm* — Imperium Patent Works; Helen Mao

(57) ABSTRACT

Apparatus and methods are provided to enhance HARQ mechanism. In one novel aspect, the UE decodes resource blocks in a HARQ indicator channel and detects a single-state HARQ indicator encoded with a UE ID of the UE. The UE determines a HARQ acknowledgment status for the data transmission based on the HARQ indicator. In one embodiment, the HARQ indicator channel is either a UE-specific channel, a group-specific channel or a cell-specific channel. In another novel aspect, the UE increases a HARQ count upon decoding the HARQ indicator channel. The UE retransmits the data transmission if the HARQ count is smaller than a predefined maximum HARQ count and the HARQ acknowledgement status is determined to be negative. Otherwise, the UE stops the data transmission. In another embodiment, the UE terminates the data transmission is the total repetition number is greater than a predefined maximum data transmission number.

23 Claims, 12 Drawing Sheets

(51) Int. Cl.
*H04L 5/00* (2006.01)
*H04W 72/04* (2009.01)
*H04W 72/14* (2009.01)

(52) U.S. Cl.
CPC ......... *H04L 5/0055* (2013.01); *H04W 72/042* (2013.01); *H04W 72/0413* (2013.01); *H04W 72/14* (2013.01)

(56) References Cited

U.S. PATENT DOCUMENTS

| | | | |
|---|---|---|---|
| 2009/0204862 A1* | 8/2009 | Chun | H04L 1/1822 714/748 |
| 2010/0195823 A1* | 8/2010 | Fukuoka | H04L 1/1607 380/31 |
| 2011/0041026 A1 | 2/2011 | Fan et al. | 714/749 |
| 2012/0163159 A1 | 6/2012 | Luo et al. | 370/210 |
| 2012/0218882 A1 | 8/2012 | Ko et al. | 370/216 |
| 2013/0272258 A1 | 10/2013 | Lee et al. | 370/329 |
| 2014/0056237 A1 | 2/2014 | Eriksson et al. | 370/329 |
| 2014/0133327 A1 | 5/2014 | Miyauchi | 370/252 |
| 2014/0133590 A1* | 5/2014 | Ahn | H04W 48/12 375/260 |
| 2014/0348091 A1 | 11/2014 | Seo et al. | 370/329 |
| 2014/0362832 A1 | 12/2014 | Rudolf et al. | 370/336 |
| 2015/0039958 A1 | 2/2015 | Vos | 714/748 |
| 2015/0074481 A1* | 3/2015 | Graumann | H04L 1/0025 714/748 |
| 2015/0085721 A1 | 3/2015 | Meng | 370/280 |
| 2016/0183231 A1 | 6/2016 | Shi et al. | 370/329 |
| 2019/0055703 A1 | 2/2019 | Li et al. | 714/748 |

FOREIGN PATENT DOCUMENTS

| | | |
|---|---|---|
| CN | 103220091 A | 1/2012 |
| EP | 1768297 A2 | 9/2005 |
| EP | 2169841 A1 | 6/2007 |
| EP | 2640117 A1 | 11/2010 |
| EP | 2757725 A1 | 11/2011 |
| WO | WO2011120443 A1 | 3/2010 |
| WO | WO2012088444 A1 | 12/2010 |
| WO | WO2013008948 A1 | 7/2011 |
| WO | WO2013112703 A2 | 1/2012 |
| WO | WO2013169164 A1 | 5/2012 |

OTHER PUBLICATIONS

International Search Report and Written Opinion of International Search Authority for PCT/CN2015/071757 dated May 6, 2015(13 pages).
EPO, Search Report for the EP patent application 15742737.8 dated Jul. 3, 2017 (7 pages).
EPO, Search Report for the EP patent application 15743668.4 dated Jul. 7, 2017 (7 pages).
USPTO, office action for the related U.S. Appl. No. 15/176,294 dated Feb. 23, 2018 (16 pages).
USPTO, office action for the related U.S. Appl. No. 15/176,294 dated Oct. 15, 2018 (12 pages).
SIPO, office action for CN patent application 201580006198.7 (no English translation is available) dated Sep. 29, 2018 (11 pages).

* cited by examiner

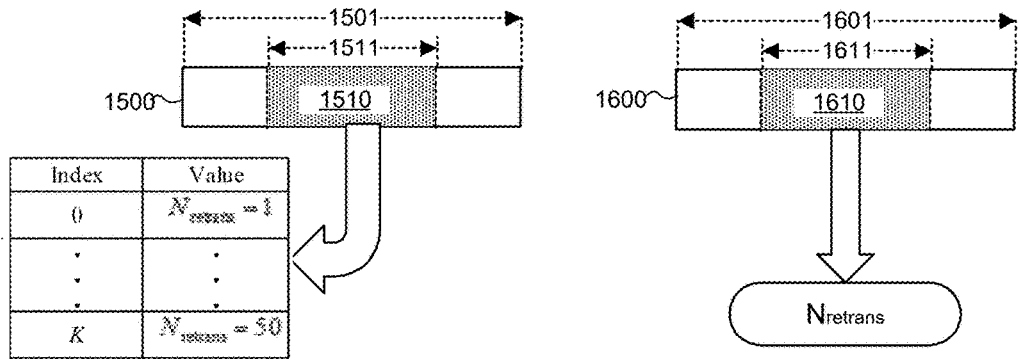
FIG. 15
FIG. 16
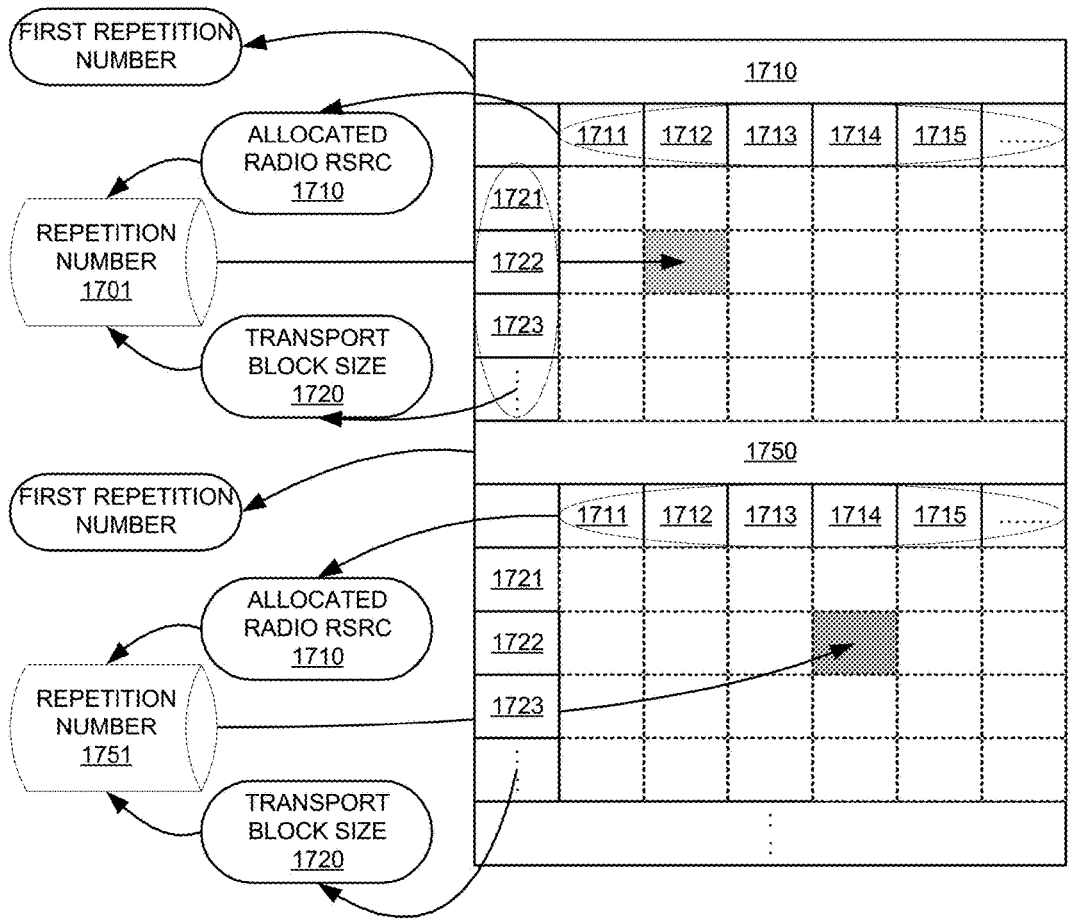
FIG. 17

METHODS FOR ENHANCED HARQ MECHANISM

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/071721, with an international filing date of Jan. 28, 2015, which in turn claims priority from International Application Number PCT/CN/2014/071684 filed on Jan. 28, 2014. This application is a continuation of International Application No. PCT/CN2015/071721, which claims priority from International Application Number PCT/CN/2014/071684. International Application No. PCT/CN2015/071721 is pending as of the filing date of this application, and the United States is a designated state in International Application No. PCT/CN2015/071721. This application claims priority under 35 U.S.C. § 120 and § 365(c) from International Application Number PCT/CN2014/071684 filed on Jan. 28, 2014. The disclosure of each of the foregoing documents is incorporated herein by reference.

TECHNICAL FIELD

The disclosed embodiments relate generally to wireless communication, and, more particularly, to enhanced HARQ mechanism.

BACKGROUND

Third generation partnership project (3GPP) and Long Term Evolution (LTE) mobile telecommunication systems provide high data rate, lower latency and improved system performances. Such systems are optimized for regular data communications, wherein there is no need for repeatedly (re)transmissions. However, in some situations, repeatedly (re)transmissions are needed. For example, some UEs, in the basements of residential buildings or locations shielded by foil-backed insulation, metalized windows or traditional thick-walled building construction, may experience significantly larger penetration losses on the radio interface than normal LTE devices. Repetition has been identified as a common technique to bridge the additional penetration losses than normal LTE devices. More resources/power is needed to support these UEs in the extreme coverage scenario. In order to transmit/retransmit the data efficiently, different repetition numbers can be applied to improve the power consumption at the UE side. A new mechanism for repeated transmissions or retransmissions with different repetition numbers is needed.

SUMMARY

Apparatus and methods are provided to enhance HARQ mechanism. In one novel aspect, the UE decodes one or more resource blocks in a HARQ indicator channel. The UE detects a single-state HARQ indicator encoded with a UE ID of the UE from the decoded HARQ indicator channel. The UE determines a HARQ acknowledgment status for the data transmission based on the HARQ indicator. In one embodiment, the HARQ indicator is generated by scrambling a sequence of coded CRC bits with a subset of the UE ID sequence. In another embodiment, the HARQ indicator is a common signal for NACK/ACK. In one embodiment, the HARQ acknowledgment status is determined to be positive if the HARQ indicator is detected. In another embodiment, the HARQ acknowledgment status is determined to be negative if the HARQ indicator is detected. In yet another embodiment, the HARQ indicator channel is a signal selected from a channel group comprising a UE-specific channel that contains only HARQ indicator resource blocks for the UE, a group-specific channel that contains HARQ indicator resource blocks for a plurality of UEs, and a cell-specific channel that contains HARQ indicator resource blocks for multiple UEs belonging to the same cell.

In another novel aspect, the UE increases a HARQ count upon decoding the HARQ indicator channel that is configured with single-state HARQ indicators. The UE retransmits the data transmission if the HARQ count is smaller than a predefined maximum HARQ count and the HARQ acknowledgement status is determined to be negative. Otherwise, the UE stops decoding the HARQ indicator channel. In one embodiment, the data block is initially transmitted repeatedly with a first repetition number and retransmitted repeatedly with a second repetition number. The UE updates a data transmission count with the repetition numbers. The UE stops retransmission of the data block upon detecting the data transmission count is greater than a predefined maximum data transmission number.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 15 shows an exemplary diagram of the second repetition number index indicated in an uplink grant message.

FIG. 16 shows an exemplary diagram of the second repetition number value indicated in an uplink grant message.

FIG. 17 illustrates an exemplary diagram of using the predefined rule to determine the second repetition number.

DETAILED DESCRIPTION

Reference will now be made in detail to some embodiments of the invention, examples of which are illustrated in the accompanying drawings.

Repetition has been identified as a common technique to bridge the additional penetration losses than normal LTE devices. In order to transmit/retransmit the data efficiently, different repetition numbers can be applied to improve the power consumption at the UE side. Further, how to send feedback for a data reception the kind of ACK/NACK determination rules are important issues for the repeatedly transmitted data communication. For normal LTE UEs, ACK or NACK can be received from the physical hybrid-ARQ indicator channel (PHICH). Combined with the received control signaling, UEs can determine to generate a new transmission or a retransmission by an adaptive/non-adaptive mechanism. For UEs in a coverage hole, the latency will be quite large to receive ACK/NACK feedback. To solve the problem, using a control signaling to determine whether data is received correctly based on a simplified rule is used for a robust data transmission. Further, for some new carrier types or carrier segmentations, legacy channels for acknowledgement feedback are not supported. How to feedback ACK/NACK for the received data in such legacy carriers is another issue needs to be addressed.

Figure 1:
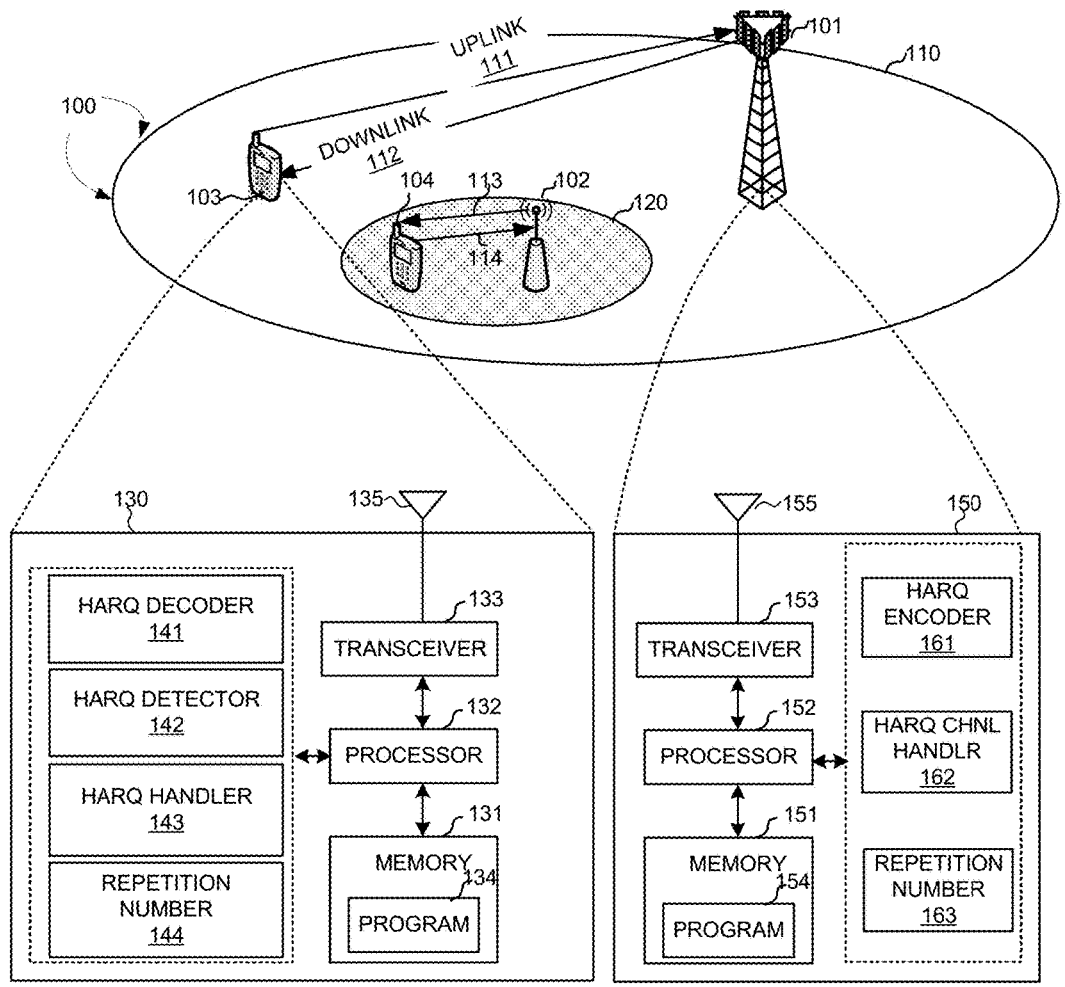
FIG. 1 is an exemplary block diagram illustrating a schematic diagram of a wireless communications system according to one embodiment of the present invention.

FIG. 1 is an exemplary block diagram illustrating a schematic diagram of a wireless communications system according to one embodiment of the present invention. A wireless communications system 100 includes one or more fixed base infrastructure units 101 and 102, forming one or more access networks 110 and 120 distributed over a geographical region. The access network 120 and 110 may be a Universal Terrestrial Radio Access Network (UTRAN) in the WCDMA technology or an E-UTRAN in the Long Term Evolution (LTE)/LTE-A technology. The base unit may also be referred to an access point, base station, Node-B, eNode-B, or other terminologies used in the art. In some systems, one or more base stations are coupled to a controller forming an access network that communicates with one or more core networks.

In FIG. 1, one or more mobile stations 103 and 104 are coupled wirelessly to base stations 101 and 102 for wireless service within a serving area, for example, a cell or within a cell sector. The mobile station may also be called as user equipment (UE), a wireless communication device, terminal or some other terminologies. Mobile station 103 sends uplink data to base stations 101 via uplink channel 111 in the time and/or frequency domain. Mobile station 104 sends uplink data to base stations 102 via uplink channel 113 in the time and/or frequency domain. The serving base stations 101 and 102 transmit downlink signals via a downlink channel 112 and 114 to mobile stations 103 and 104, respectively. In one embodiment, the system utilizes Orthogonal Frequency Division Multiplexing Access (OFDMA) or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remote units are served by assigning downlink or uplink radio resources that typically comprises a set of sub-carriers over one or more OFDM symbols. Exemplary OFDMA based protocols include the developing LTE/LTE-A of the 3GPP standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the communication system may utilize other cellular communication system protocols including, but not limited to, TDMA or direct sequence CDMA. The disclosure, however, is not intended to be limited to any particular wireless communication system.

In FIG. 1, wireless communication network 100 is an OFDM/OFDMA system comprising a base station eNB 101 and eNB 102, and a plurality of mobile station 103 and mobile station 104. When there is at least one downlink data block to be sent from base station to mobile station, each mobile station gets a downlink assignment, e.g., a set of radio resources in a physical downlink shared channel (PDSCH). When a UE needs to send at least one uplink data block to base station, the mobile station gets a grant from the base station that assigns a set of uplink radio resources. In 3GPP LTE system based on OFDMA downlink, the radio resource is partitioned into subframes each of which is comprised of two slots and each slot has seven OFDMA symbols in the case of normal Cyclic Prefix (CP). Each OFDMA symbol further consists of a number of OFDMA subcarriers depending on the system bandwidth. The basic unit of the radio resource grid is called Resource Element (RE), which spans an OFDMA subcarrier over one OFDMA symbol. One type of the basic block of the radio resources for scheduling in LTE is called physical resource block (PRB), each of which contains several consecutive OFDM symbols in one subframe and several consecutive subcarriers in frequency domain. Virtual resource blocks (VRB) is another type of the basic block of the radio resources definition in LTE system, which have two types: localized type and distributed type. For each virtual resource block pair, pair of virtual resource blocks over two slots in a subframe are assigned together by a single virtual resource block number. One downlink assignment or an uplink grant comprises one or multiple basic blocks of the radio resources, e.g., a set of PRBs.

Due to the variation of wireless channel or coverage problem, the transmitted data may not be received correctly at the reception end. Then, one or multiple retransmission(s) for a data transmission will be required if the transmitter end receives a negative acknowledgement (NACK) feedback from the reception end. If a positive acknowledgement, i.e., an ACK, is received, UEs may assume that the data is received correctly. Many specifications for wireless communications specify such mechanism to guarantee data to be transmitted correctly, and there are many designs to feedback ACK/NACK. Taking the normal UEs in LTE/LTE-A system, physical hybrid automatic repeat request (HARQ) indicator channel (PHICH) transmitted by the base station is designed to feedback ACK/NACK for uplink data transmission from mobile stations. However, there is no consensus how to feedback an acknowledgement of a data transmission for UEs in a coverage hole, such as the working item "Low cost and enhanced coverage MTC UEs for LTE with a 15 dB coverage improvement" in LTE. Further, there is some discussion to introduce a new type of carrier or carrier segmentation for traffic offloading, wherein the demodulation reference signals will be redesigned or there is no common cell-specific signal for legacy ACK/NACK feedback. Then, this invention proposes a new HARQ indicator channel to feedback ACK/NACK.

Further, a new HARQ mechanism is proposed, especially considering UEs with bad coverage. To improve the reliability of the transmission for these UEs, multiple subframes may be bundled for one block transmission, where the same set of radio resources over these bundled subframes is allocated. Under these cases, repetition number or subframe number is an important factor for a correct data transmission. Then, How to transmit or retransmit with a proper repetition number is an open issue.

For convenience, the new HARQ indicator channel is named as enhanced PHICH (EPHICH), considering the function of this new channel is quite similar to that of legacy PHICH, which informs UEs the acknowledgement state of an uplink data reception. The signal transmitted in EPHICH is named as a HARQ indicator, indicating the acknowledgement state. The terminology used throughout this invention is an example to describe the proposed concepts and methods clearly, and does not limit its application in other systems.

For an acknowledgement state feedback, this invention proposes that a signal for ACK/NACK transmitted in EPHICH is generated from a UE identity. Then, a UE can perform the signal detection to check whether the received HARQ indicator contains the UE identity and determine whether the detected signal is the ACK/NACK signal for itself. In one embodiment, such UE identity is Cell Radio Network Temporary Identity (C-RNTI) or C-RNTI sequence. In another embodiment, the UE identity is a UE ID at MME, like SAE Temporary Mobile Subscriber Identity (S-TMSI). In a third embodiment, the UE identity is a configuration from a higher layer and varies with time semi-statically. In these embodiments of the present invention, the UE identity can be UE-specific or group-specific.

According to the embodiments of the present invention, the signal generated from the UE identity is a subset or an extension of a UE identity sequence in one embodiment. For example, the signal for ACK is a subset of C-RNTI sequence and a UE can determine that the data is received correctly if such signal containing a UE identity is detected.

In another embodiment, an ACK/NACK signal is a sequence of coded CRC bits, where the CRC bits are generated from a common signal for ACK/NACK and scrambled with a subset of UE-identity sequence. Here, the common signal for ACK or NACK is predefined. For example, "0" stands for an ACK and "1" represents a NACK. In one novel aspect, the common signal for ACK or NACK is the single-state HARQ indicator for ACK or NACK. It means one state of the common signal indicates ACK or NACK, and the other state of the signal could be reused for other data transmissions. Therefore, the single-state HARQ indicator could be one state of the common signal, for example, the common signal could be a combination of at least one bit, and only one state of the common signal is used as the single-state HARQ indicator.

In a third embodiment, a HARQ indicator is a sequence of coded common signals for ACK/NACK and a CRC sequence, scrambled with a UE identity sequence. Here, the UE identity is group specific and multiple UEs decode such indicator channel to obtain the acknowledgement. Further, a UE grouping is performed since one HARQ indicator comprises multiple ACK/NACK signals. After receiving the HARQ indicator channel, a UE obtains its own ACK/NACK signal by checking a HARQ index, where the HARQ index is configured by a higher layer, or based on a function of a UE-specific identity.

In a fourth embodiment, a NACK signal is generated by encoding a block of bits and a CRC sequence, where the CRC sequence is generated from the block of bits and scrambled by a subset of UE identity sequence. Here, the block of bits for NACK is a signal comprising NACK at least. Further, a second repetition number for a retransmission is also contained in such signal for NACK.

FIG. 1 further shows a simplified block diagram of base station 101 in accordance to the current invention. Base station 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in base station 101. Memory 151 stores program instructions and data 154 to control the operations of base station 101.

Base station 101 also includes a HARQ encoder 161, a HARQ channel handler 162 and a repetition number module 163 in accordance to embodiments of the current invention. In one example, HARQ encoder 161 detects a NACK/ACK condition of the received transmission from UE, encodes the NACK/ACK in a single-state indication to the HARQ channel via processors 163 through a control module. HARQ channel handler 162 generates HARQ channel information based on the output from the HARQ encoder 161 and sends the HARQ signal to the UE. Repetition number module 163 determines different repetition number for the initial transmission and retransmission.

FIG. 1 also shows a simplified block diagram of mobile station 103 in accordance to the current invention. Mobile station 103 has an antenna 135, which transmits and receives radio signals. An RF transceiver module 133, coupled with the antenna, receives RF signals from antenna 135, converts them to baseband signals and sends them to processor 132.

RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103.

Mobile station 103 includes several modules that carry out different tasks in accordance with embodiments of the current invention. A HARQ decoder 141, a HARQ detector 142, a HARQ channel handler 143 and a repetition number module 144. HARQ decoder 141 decodes the single-state HARQ indicator received from the base station for mobile station 103. HARQ detector 142 detects a HARQ signal channel. HARQ channel handler 143 obtains the HARQ indicator received and processes the HARQ information. Repetition number module 144 determines the repetition number for the initial transmission and the retransmission for mobile station 103.

Single-State HARQ Indicator

Figure 2:
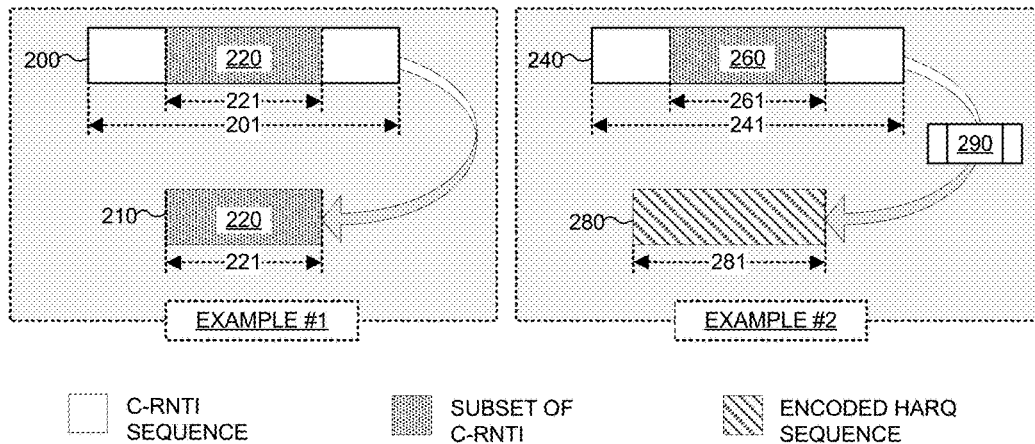
FIG. 2 shows exemplary diagrams of the single-state indicator of ACK/NACK signal.

FIG. 2 shows exemplary diagrams of the single-state indicator of ACK/NACK signal. In Example #1, sequence 200 is a C-RNTI sequence with a size 201. Sequence 220 is the transmitted UE-specific single-state ACK/NACK signal with size 221. Sequence 220 is a subset of sequence 200. Different from Example #1, the UE-specific single-state ACK/NACK signal in Example #2 is a transformation of the UE-specific sequence. A sequence 240 is a C-RNTI sequence with a size 241. A sequence 260 with size 261 is a subset of sequence 240. According to a predefined signal generation function 290, a UE-specific ACK/NACK signal 280 with a size 281 is generated from sequence 260. Within the signal generation function 290, a CRC sequence with size 281 is generated from a common NACK signal first. Then, the CRC sequence is scrambled with sequence 260.

After receiving a HARQ indicator channel, UEs will determine the acknowledgement state on a predefined mapping way from the result of signal detection. In one novel aspect, only one state of HARQ signal is transmitted in a HARQ indicator channel. In one embodiment, only a signal for the negative acknowledgement state is transmitted by the HARQ indicator. If a UE detects the single-state indicator in the HARQ signal, the UE determines that the data block is not received correctly. Otherwise, if the single-state indicator is not detected in the HARQ indicator within the set of resources, the UE determines that the data block is received correctly. Such rule can be predefined. In another embodiment, a HARQ indicator comprising only a signal for the positive acknowledgement is transmitted. A UE can determine the transmitted data block is received correctly if the signal is detected in the received HARQ indicator channel. Otherwise, the UE can assume that the data block is not received correctly. Note that the unused resources for the HARQ indicator can be reallocated to other signals or channels, since only one acknowledgement state is transmitted in the HARQ indicator channel.

Figures 3, 4:
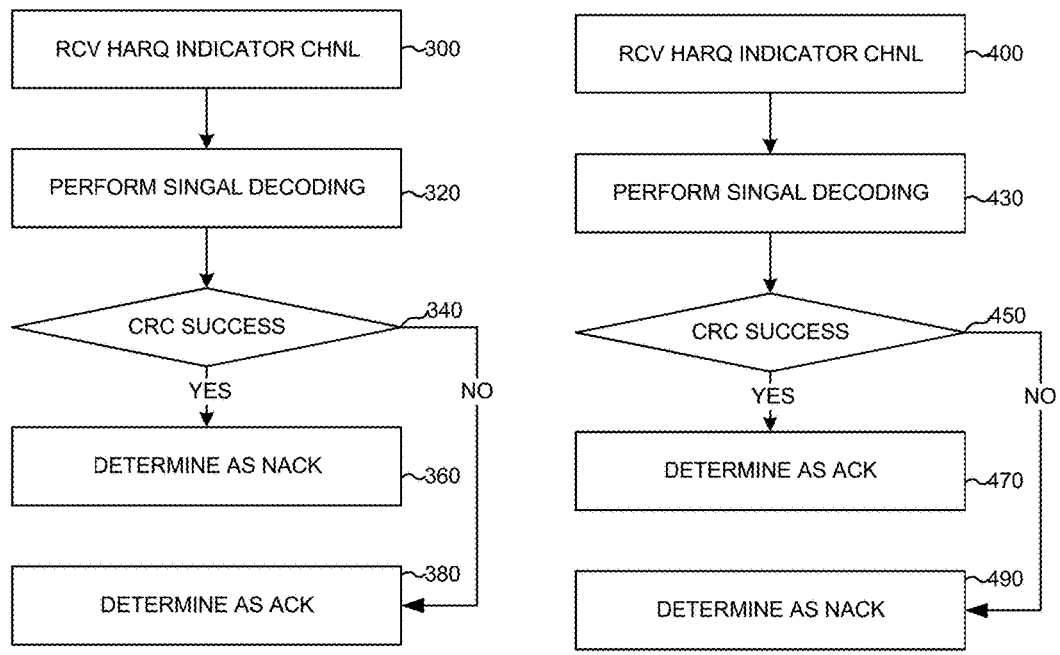
FIG. 3 shows exemplary flow diagram of determining a HARQ NACK state upon detecting the HARQ indicator.
FIG. 4 shows exemplary flow diagram of determining a HARQ ACK state upon detecting the HARQ indicator.

FIG. 3 shows an exemplary flow diagram of determining a HARQ NACK state upon detecting the HARQ indicator. After receiving a HARQ indicator channel (Step 300), UEs further check whether CRC passes (Step 340) from the result of decoded signal in Step 320. Here, the HARQ signal is a block of coded bits containing a CRC sequence, which is scrambled with C-RNTI. If CRC check passes, the acknowledgement state is determined as negative (NACK) (Step 340). Otherwise, a positive acknowledgement is determined (Step 380).

FIG. 4 shows exemplary flow diagram of determining a HARQ ACK state upon detecting the HARQ indicator. Different from Example #1 in FIG. 3, UEs determine the acknowledgement is positive (Step 470) if the UE identity is contained from the detected signal in Example #2 shown in FIG. 4. Otherwise, a negative acknowledgement is assumed. In this example, the HARQ signal is a C-RNTI sequence.

In one novel aspect, one signal for one HARQ state, either ACK or NACK, is transmitted to improve resource efficiency. In the traditional two-state indicator, where "0" and "1" are used to represent the NACK and ACK, respectively, the HARQ indicator is transmitted for every transmission. In one embodiment, the single-state HARQ indicator is transmitted only when the transmission is successful and an ACK is needed. In another embodiment, the single-state HARQ indicator is transmitted only when the transmission is unsuccessful and a NACK is needed. The unused states or resources for the HARQ indicator channel will be allocated for other signals or channels, if there is no HARQ signal to be transmitted. In one embodiment, only a signal for NACK is transmitted. Alternatively, only a signal for ACK is transmitted. Some examples are shown in FIG. 5 and FIG. 6.

Figure 5:
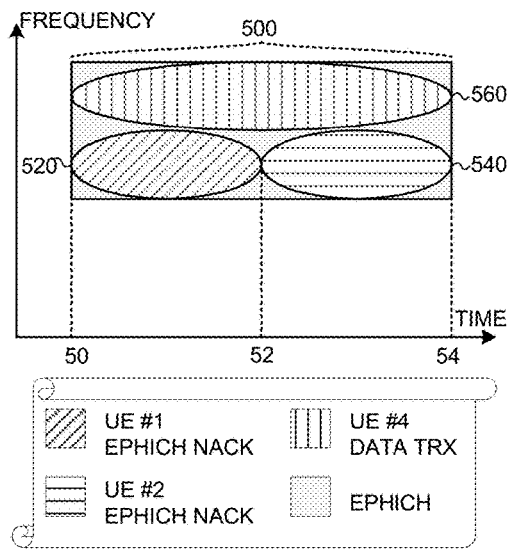
FIG. 5 shows an exemplary diagram of reusing a HARQ indicator channel with ACK for data transmission.

FIG. 5 shows an exemplary diagram of reusing a HARQ indicator channel with ACK for data transmission. A set of frequency-time radio resources 500, spanning from subframe 50 to subframe 54, are allocated for a HARQ indicator channel for UE#1, UE#2 and UE#3. In one embodiment, only a signal for the negative acknowledgement (NACK) is transmitted in the HARQ indicator channel. For UE#1 and UE#2, HARQ indicators containing a negative acknowledgement are transmitted within the resources 520 and 540, respectively. Resources 560, which are allocated to transmit HARQ information for UE#3 is not used for HARQ indicator because transmission from UE#3 is successful. Instead of having to transmit an ACK for UE#3, there is no HARQ indicator needed for UE#3 using the single-state HARQ indicator method. In one embodiment, resources 560 allocated for UE#3 HARQ are allocated and reused for the downlink data transmission to UE#4. Upon decoding the HARQ signal channels, UE#1 and UE#2 determine that the previously transmitted/retransmitted data block is not received correctly at the base station, while UE#3 can assume that the transmitted/retransmitted data block is transmitted successfully, since no NACK signal is detected from the EPHICH resources 560.

Figure 6:
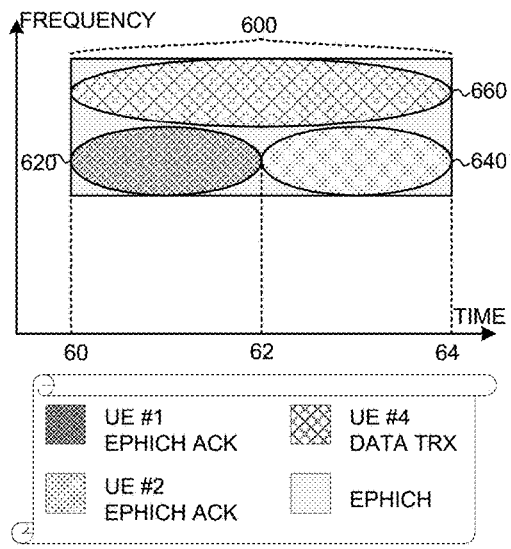
FIG. 6 shows an exemplary diagram of reusing a HARQ indicator channel with NACK for data transmission.

FIG. 6 shows an exemplary diagram of reusing a HARQ indicator channel with NACK for data transmission. Different from the example in FIG. 5, only ACK signal is transmitted in a HARQ indicator channel in FIG. 6. There are also three UEs expecting to receive ACK feedback from the base station. A set of resources 620 and 640 are used for ACK feedback to UE#1 and UE#2, respectively. UE#1 and UE#2 determine that the transmitted or retransmitted data block is received correctly at the base station when receiving ACK feedback. For UE#3, it can be assumed that the transmitted or retransmitted data is not received correctly, due to the absence of ACK signal in resource block 660, which is allocated to UE#3 as its HARQ signal channel. In one embodiment, resources 560 allocated for UE#3 HARQ are allocated and reused for the downlink data transmission to UE#4.

In one novel aspect, if there is no ACK or NACK signal to be transmitted, the unused resources can be used for other signals or data channels. As shown in FIG. 5 and FIG. 6, because the HARQ indicator resources are only used for a single-state (ACK or NACK), the resources are not needed for each transmission. The unused HARQ resources can be reused for other UEs and/or for other channels. The efficiency of the use of HARQ resources is improved.

In another novel aspect, the EPHICH can be a UE-specific channel, a group-specific channel or a cell-specific channel. In one embodiment, a set of UE-specific resources is allocated to one UE only. The allocated set of resources is orthogonal to, or overlaps partially with the EPHICH resources for other UEs. A predefined rule based on some UE-specific identities is designed for UEs to determine the resources. Alternatively, the UE-specific resources are configured or reconfigured by a higher layer.

In another embodiment, a set of group-specific resources is allocated to multiple UEs if EPHICH is group-specific. The group-specific resources are separated into multiple subsets of resources. One subset of resources is allocated for one UE. Each subset of resources is orthogonal to, or overlaps fully or partially with other subsets of resources. UE grouping is required. For each group of UEs, one dedicated set of resources for the HARQ indicator channel are allocated. Multiple HARQ indicators are transmitted within the allocated resources. Within a cell, multiple group-specific HARQ indicator channels can be transmitted simultaneously. The allocated resources to these channels can be separate from each other, or overlap partially/fully. A predefined rule based on some group-specific parameter is designed for UEs to determine the allocation of resources. Alternatively, the group-specific resources are configured or reconfigured by a higher layer.

In yet another embodiment, a cell-specific set of resources is assigned to all UEs within the cell. Within the set of resources, a HARQ indicator for one UE occupies a subset of resources. Further, different subsets of resources are orthogonal, or overlap partially/fully. The resources for the HARQ indicator channel are broadcasted to all UEs, or determined by a predefined rule based on some cell-specific parameters, such as a cell ID.

Figure 7:
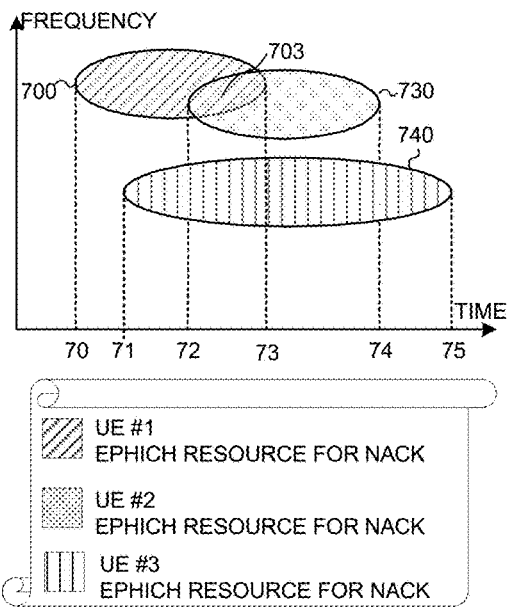
FIG. 7 shows and exemplary diagram of a UE-specific EPHICH resource allocation.

FIG. 7 shows and exemplary diagram of a UE-specific EPHICH resource allocation. Three HARQ indicator channels 700, 730 and 740 are configured. HARQ indicator channels 700, 730 and 740 are configured for UE#1, UE#2 and UE#3, respectively. Each HARQ indicator channel occupies a different set of radio resources. The resources for the HARQ indicator channel 700 start from subframe 70 to subframe 73. The radio resources for HARQ indicator channel 740 span over subframes from 71 to 75. The resources for channels 700 and 740 are orthogonal to each other. The resources for HARQ indicator channel 730 start from subframe 72 to subframe 74. There is a resource overlap 703 between the resources for the HARQ indicator channel 700 and channel 730.

Figure 8:
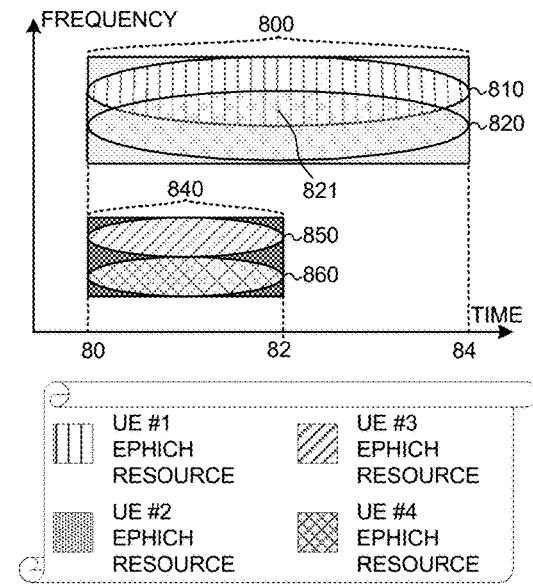
FIG. 8 shows and exemplary diagram of a group-specific EPHICH resource allocation.

FIG. 8 shows and exemplary diagram of a group-specific EPHICH resource allocation. Two sets of radio resources 800 and 840 are allocated to two sets HARQ indicator channels. The two sets of radio resources are orthogonal to each other. Within the set of resources 800, which spans over subframe 80 to subframe 84, two HARQ indicators are transmitted, occupying a subset of radio resources 810 and 820. Resources 810 and 820 overlap partially. HARQ indicator channel 810 and 820 overlap at resource 821. In another set of radio resources 840, the whole set of resources is separated into two orthogonal subsets 850 and 860 for two HARQ indicators.

Figure 9:
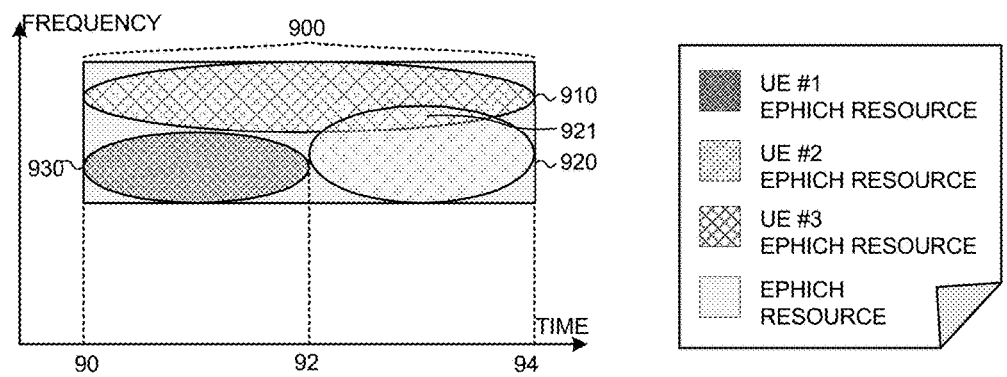
FIG. 9 shows and exemplary diagram of a cell-specific EPHICH resource allocation.

FIG. 9 shows and exemplary diagram of a cell-specific EPHICH resource allocation. Only one set of radio resources 900 is allocated for a cell-specific HARQ indicator channel. In this example, three HARQ indicators are transmitted within three subsets of radio resources 910, 920 and 930. Radio resource 910 is orthogonal to radio resource 930. Radio resource 930 is orthogonal to radio resource 920. Radio resources 910 overlap with radio resource 920 at resource 921.

Repetition Number Handling

To improve the spectrum efficiency and UE power consumption, a new transmission/retransmission mechanism with multiple repetition levels is proposed. The repetition number during the retransmissions can be different from the repetition number for the first or the initial transmission. In one embodiment, a data block is transmitted repeatedly by a first repetition number after an uplink message is given for the first or the initial transmission. If feedback indicating the NACK is received, the UE transmits the data block with a second repetition number during following retransmissions. In one embodiment, the second repetition number is smaller than the first repetition number. The first repetition number for the initial transmission is noted as $N_{initial}$, and the second repetition number for kth retransmission is $N_{retrans}^k$, where k=1, 2, .... In one embodiment, $N_{initial} > (N_{retrans}^k = N_{retrans}^l)$ where k≠l, (k, l=1, 2 ...).

In another embodiment, a first repetition number for the initial transmission is applied for the repetition of the initial transmission of a data block. If a NACK is received, a second repetition number, smaller than the first repetition number, is applied during a retransmission of the data block. Further, a second repetition number for each repetition number is different. In one embodiment, the repetition number reduces each time, i.e., $N_{initial} > N_{retrans}^k > N_{retrans}^l$, where l≤k<l.

Figure 10:
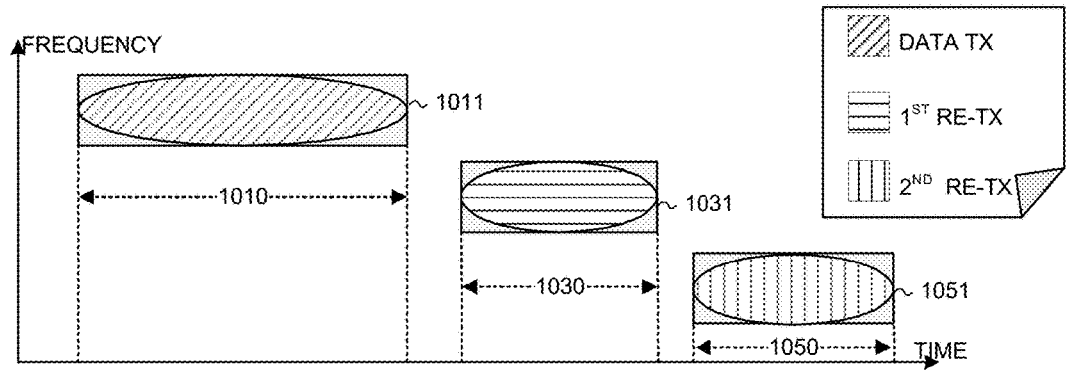
FIG. 10 shows and exemplary diagram for a data block transmission/retransmission with different repetition levels where different frequency resources are used.

FIG. 10 shows and exemplary diagram for a data block transmission/retransmission with different repetition levels where different frequency resources are used. A data block is transmitted repeatedly with a repetition number 1010 from subframe 1001, for the first time. During the first and the second retransmission, the data block is transmitted with a second repetition number 1030 and 1050, where 1030 is equal to 1050. Further, 1030 and 1050 are smaller than 1010. The starting subframe for the first and the second retransmission is different, noted as 1002 and 1003. A set of radio resources 1011, 1031 and 1051 is allocated for the initial data transmission and the data retransmissions. The three sets of radio resources, 1010, 1030, and 1050 are orthogonal in frequency domain.

Figure 11:
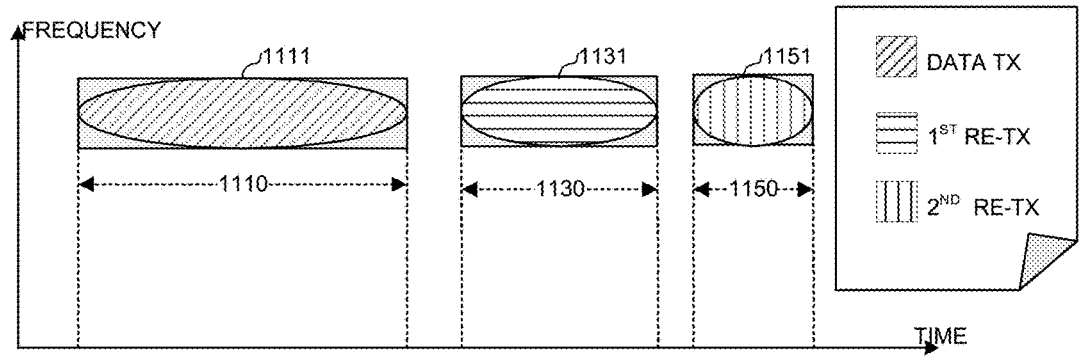
FIG. 11 shows and exemplary diagram for a data block transmission/retransmission with different repetition levels where the same frequency resources are used.

FIG. 11 shows and exemplary diagram for a data block transmission/retransmission with different repetition levels where the same frequency resources are used. In the initial transmission, the first and the second retransmissions, a data block is transmitted by a repetition number 1110, 1130 and 1150, where the repetition number 1110> the repetition number 1130> repetition number 1150. In this example, the data block is transmitted at three different starting subframes 1101, 1102 and 1103, respectively. The same set of resources for the transmission in the frequency domain is used. For example, resources used during retransmission are the resources allocated for the initial transmission.

In one novel aspect, the first repetition number can be indicated by an uplink grant message for a data block, or determined by a predefined rule. In one embodiment, an indicator within an uplink grant indicates the value of a first repetition number by a value index. Subsequently, values for the first repetition number are indexed in a predefined table. The index is transmitted within the uplink grant message by a DCI format to inform UEs the first repetition number for the initial transmission. In another embodiment, the value of a first repetition number is given by an indicator in an uplink grant message directly. In a third embodiment, a first repetition number is determined according to a predefined rule. The predefined rule for the first repetition number is based on the amount of allocated resources for a data block transmission and the size of the transmitted data block. Further, a reported channel state indicator is also a parameter to determine the first repetition number. A coverage gap to be met is another parameter to determine the first repetition number.

Figure 12:
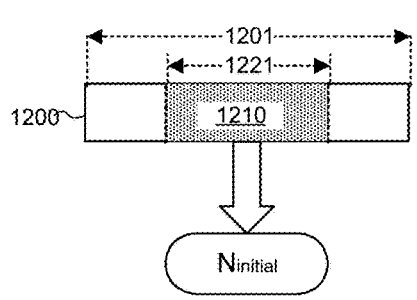
FIG. 12 shows an exemplary diagram of the first repetition number value indicated in an uplink grant message.

FIG. 12 shows an exemplary diagram of the first repetition number value indicated in an uplink grant message. An uplink grant message 1200 with a length of 1201 contains a repetition number value. An indicator 1210 with a length of 1221 is contained in uplink grant message 1200. Indicator 1210 represents the repetition number upon decoding.

Figure 13:
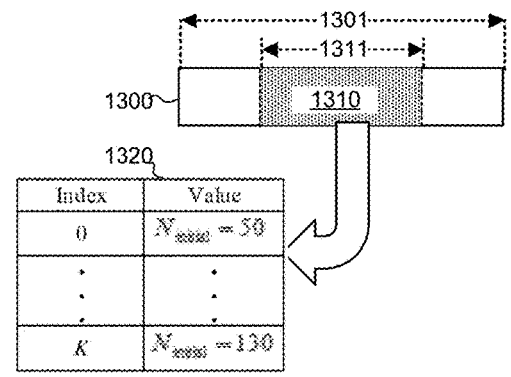
FIG. 13 shows an exemplary diagram of the first repetition number index indicated in an uplink grant message.

FIG. 13 shows an exemplary diagram of the first repetition number index indicated in an uplink grant message. An uplink grant message 1300 with a length of 1301 contains a repetition number index. An indicator 1310 with a length of 1311 is contained in uplink grant message 1300. Indicator 1310 represents the repetition number index upon decoding. A repetition number table 1320 converts the received repetition number index to a repetition number value. By looking up the predefined table 1320, the UE obtains value of the first repetition number based on the received repetition number index 1310.

Figure 14:
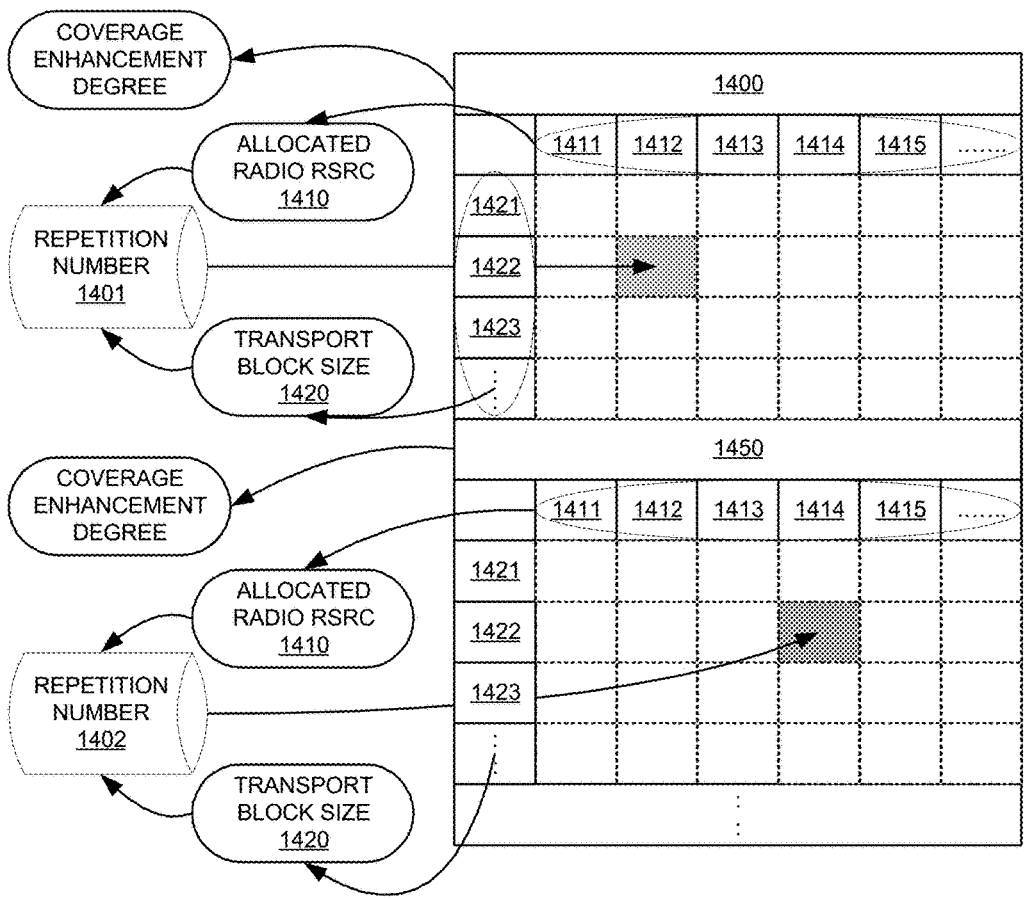
FIG. 14 illustrates an exemplary diagram of using the predefined rule to determine the first repetition number.

FIG. 14 illustrates an exemplary diagram of using the predefined rule to determine the first repetition number. Different values for a coverage enhancement degree are 1400 and 1450. A set of value 1410 presents the amount of allocated radio resources for a data block transmission. The set of value 1410 comprises multiple values, such as 1411, 1412. Another set of value 1420 is a transport block size (TBS), listing all values of block size such as 1421 and 1422. Correspondingly, different value sets for the first repetition number can be obtained and expressed as block 1401 and 1402. In one embodiment, the UE obtains the resource amount value and TBS from a received uplink grant message. The UE determines an explicit value for the first repetition number, by looking up the table based on the resource amount value and TBS value.

In another novel aspect, the second repetition number for retransmission can be indicated by an indicator in an uplink grant message in one embodiment. One example is a value index for the second repetition is transmitted in the uplink grant message. The second repetition number is determined by checking the value index from a predefined value set or predefined value table. In another embodiment, the second repetition number is an explicit value indicated by an indicator in the uplink grant message. In yet another embodiment, the second repetition number is obtained from a feedback NACK signal, which comprises a NACK signal, and a second repetition number. Except for a dedicated HARQ channel, such feedback NACK signal can also be transmitted by a compact DCI format transmitted in a control region. In one embodiment, the second repetition number is selected from a value set for the second repetition number, according to the determination rule for the second repetition number. The determination rule is based on the first repetition number, the amount of resources for a retransmission and the index of a retransmission. In addition, the size of the transmitted data block, or a coverage enhancement gap is also considered to determine the second repetition number.

FIG. 15 shows an exemplary diagram of the second repetition number index indicated in an uplink grant message. An uplink grant message 1500 with the size of 1501 comprises an indicator 1510 with the size of 1511. Indicator 1510 indicates a value index for the second repetition number. The UE determines the value of the second repetition number by checking a predefined value table for the second repetition number $N_{retrans}$.

FIG. 16 shows an exemplary diagram of the second repetition number value indicated in an uplink grant message. An uplink grant message 1600 with the size of 1601 comprises an indicator 1610 with the size of 1611. Indicator 1610 indicates the second repetition number value. The UE obtains the second repetition number $N_{retrans}$ upon decoding indicator 1610.

FIG. 17 illustrates an exemplary diagram of using the predefined rule to determine the second repetition number. Entries 1710 and 1750 are two different values for the first repetition number. Under a certain value of the first repetition number, by checking the amount of allocated radio resources (1711, 1712, etc.) from a value set 1710 and the data block size (1721, 1722, etc.) from a value set 1720, the value of the second repetition number can be obtained explicitly from the value set 1701 and 1751.

As shown in FIG. 10 and FIG. 11, the resources for a data block transmission/retransmission in the frequency domain can be different or identical. In one embodiment, the resources for the retransmission can be specified as the resources for the initial transmission in one embodiment. In another embodiment, the resources for retransmissions are determined according to a predefined rule. The predefined rule specifies the set of resources for a retransmission is obtained by adding an offset to the resources for the initial transmission. The resource offset is a function of a retransmission index, a starting subframe or frame index of a retransmission, or a combination of these parameters. As a result, the resources for the initial transmission and each retransmission can be orthogonal to each other, or overlap partially/fully in frequency domain.

One exemplary expression to determine the resources for a kth retransmission $I_{RB}^k$ is defined as:

$$I_{RB}^k = (I_{RB}^{init} + k) \bmod N_{RB}^{UL}, k=1,2, \tag{1}$$

where $I_{RB}^k$ is an index of allocated PRBs for kth retransmission over the channel bandwidth, $I_{RB}^{init}$ an index of allocated PRBs for the initial transmission over the channel bandwidth, and $N_{RB}^{UL}$ is the channel bandwidth expressed as PRB number.

Another exemplary expression to determine the resources for kth retransmission $I_{RB}^k$ is defined as:

$$I_{RB}^k = (I_{RB}^{init} + S_k \bmod 1024) \bmod N_{RB}^{UL}, k=1,2, \tag{2}$$

where $I_{RB}^k$ is an index of allocated PRBs for kth retransmission over the channel bandwidth, $I_{RB}^{init}$ is an index of allocated PRBs for the initial transmission over the channel bandwidth, $S_k$ is the starting frame index of kth retransmission, and $N_{RB}^{UL}$ is the channel bandwidth expressed as PRB number.

Multiple HARQ Indicators Handling

To guarantee a robust transmission of ACK/NACK signal and improve the resource/power efficiency, a mechanism of multiple HARQ indicators feedback to one uplink data block is supported in this invention, and a UE is required to receive multiple HARQ indicators. In one embodiment, a maximal number for HARQ indicators transmission is specified, and expressed as $N_{HARQ}^{max}$. A UE should determine whether to receive another HARQ indicator after a transmission or a retransmission if a NACK is received previously or after receiving an ACK. If the cumulated number of received HARQ indicators is smaller than the threshold, the UE will try to receive another HARQ indicator regardless of the previously received acknowledgement state.

In another embodiment, a maximal number for HARQ indicators transmission is specified, and expressed as $N_{HARQ}^{max}$. A UE should determine whether to receive another HARQ indicator after a (re)transmission. If the cumulated number of received HARQ indicators does not exceed the maximal number, the UE will try to receive another HARQ indicator for this transmission. In case a positive acknowledgement is assumed at UE side, the UE will stop transmission and will not receive another HARQ indicator.

In a third embodiment, a maximum number of HARQ indicators indicating ACK is specified and expressed as $N_{ACK}^{max}$. A UE should determines whether to receive another HARQ indicator after a HARQ indicator indicating ACK is received previously.

Figure 18:
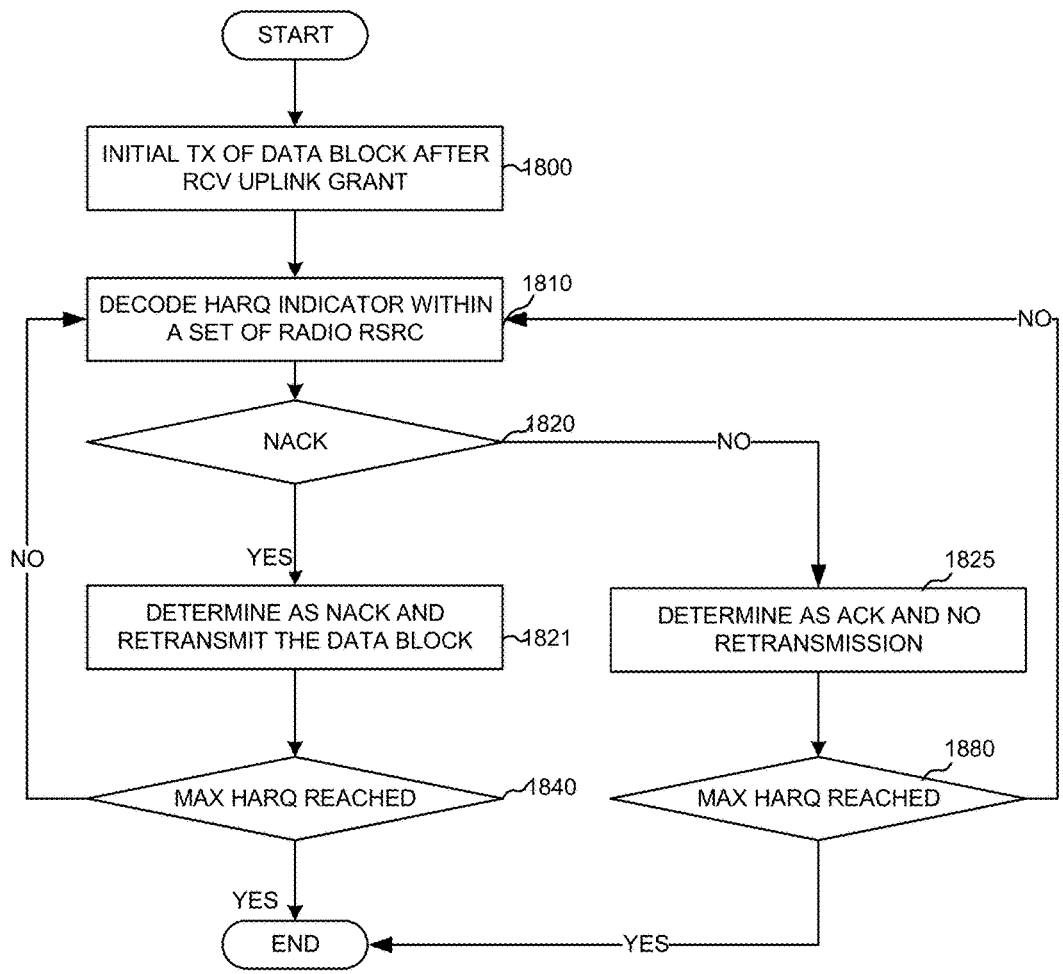
FIG. 18 is an exemplary flow chart of a HARQ receiving procedure where the UE terminates the procedure upon reaching a maximum number of decoding.

FIG. 18 is an exemplary flow chart of a HARQ receiving procedure where the UE terminates the procedure upon a maximum number of decoding is reached. The UE receives a HARQ indicator channel (Step 1810) after an initial transmission (Step 1800) and updates the HARQ indicator number counter by adding one. Subsequently, an ACK/NACK determination (Step 1820) is performed. If Step 1820 determines that a NACK is indicated by the received HARQ indicator, the UE moves to Step 1821 and retransmits the data block with a second repetition number. After the retransmission, a further check for a cumulated number of received HARQ indicators is performed (Step 1840). If the cumulated number of received HARQ indicators is not larger than the specified threshold, the UE will continue to receive another HARQ indicator for this retransmission at Step 1841. Otherwise, this transmission of the data block finishes. If Step 1820 determines that NACK is not received, no retransmission is performed at Step 1825. The UE moves to Step 1880 and checks whether to receive another HARQ indicator. If the threshold for the HARQ indicator is not reached, the UE moves back to 1810 to wait for another HARQ indicator, otherwise this transmission of the data block finishes.

Figure 19:
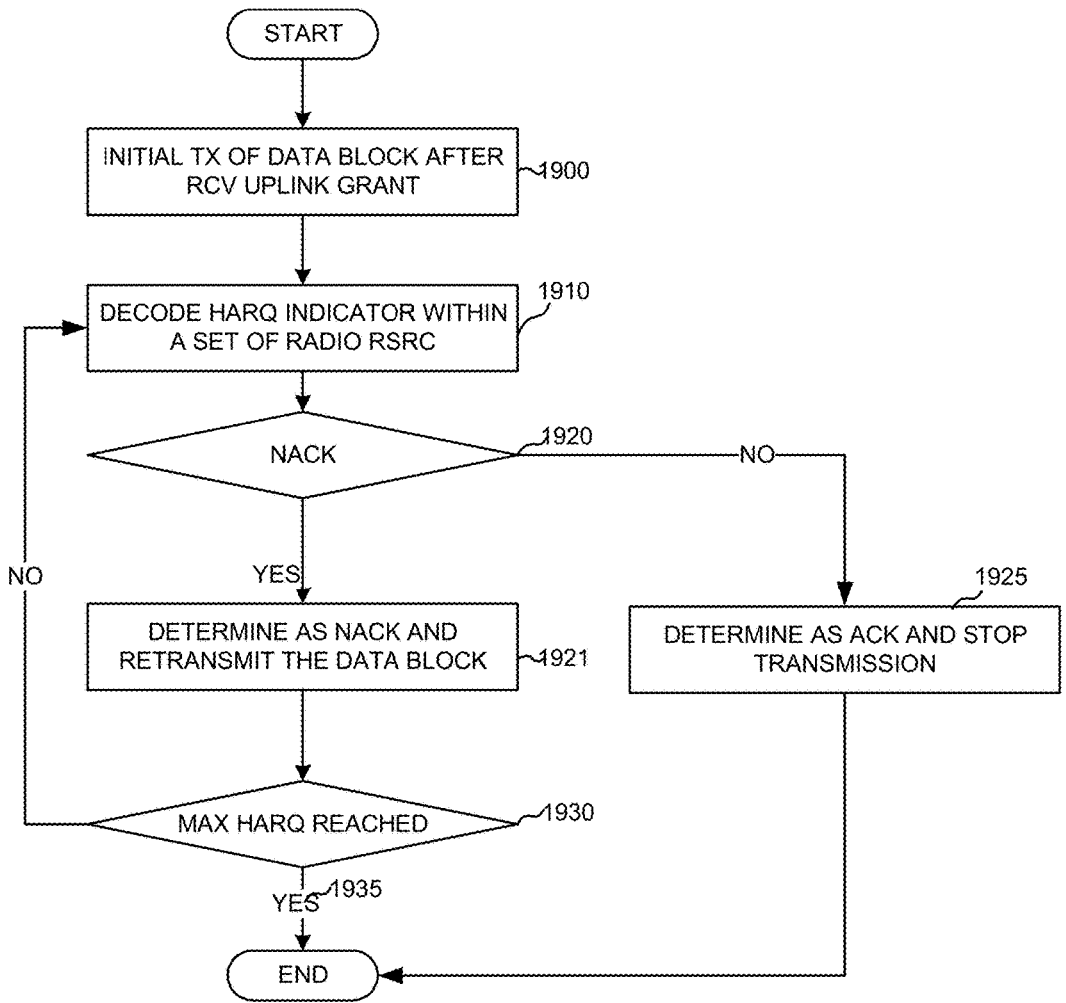
FIG. 19 is an exemplary flow chart of a HARQ receiving procedure where the UE terminates the procedure upon reaching a maximum number of NACK or upon an ACK is determined.

FIG. 19 is an exemplary flow chart of a HARQ receiving procedure where the UE terminates the procedure upon a maximum number of NACK is reached or upon an ACK is determined. The UE receives a HARQ indicator channel (Step 1910) after a data block transmission with a first repetition number (Step 1900) and performs an ACK/NACK determination (Step 1920). During Step 1910, the counter for the HARQ indicator is updated by adding one every time a HARQ indicator is received. Step 1921 means a NACK is indicated by the received HARQ indicator, and a retransmission with a second repetition number is performed correspondingly. After the retransmission, a further check for a cumulated number of received HARQ indicators is performed (Step 1930). If the cumulated number of received HARQ indicators is not larger than the specified maximum number for HARQ indicator, the UE will continue to receive another HARQ indicator for this retransmission, as expressed by Step 1931, otherwise the process of the data block transmission ends (Step 1935). Different from the example in FIG. 18, the UE will finish this transmission of the data block if a positive acknowledgement state is determined (Step 1925).

Figure 20:
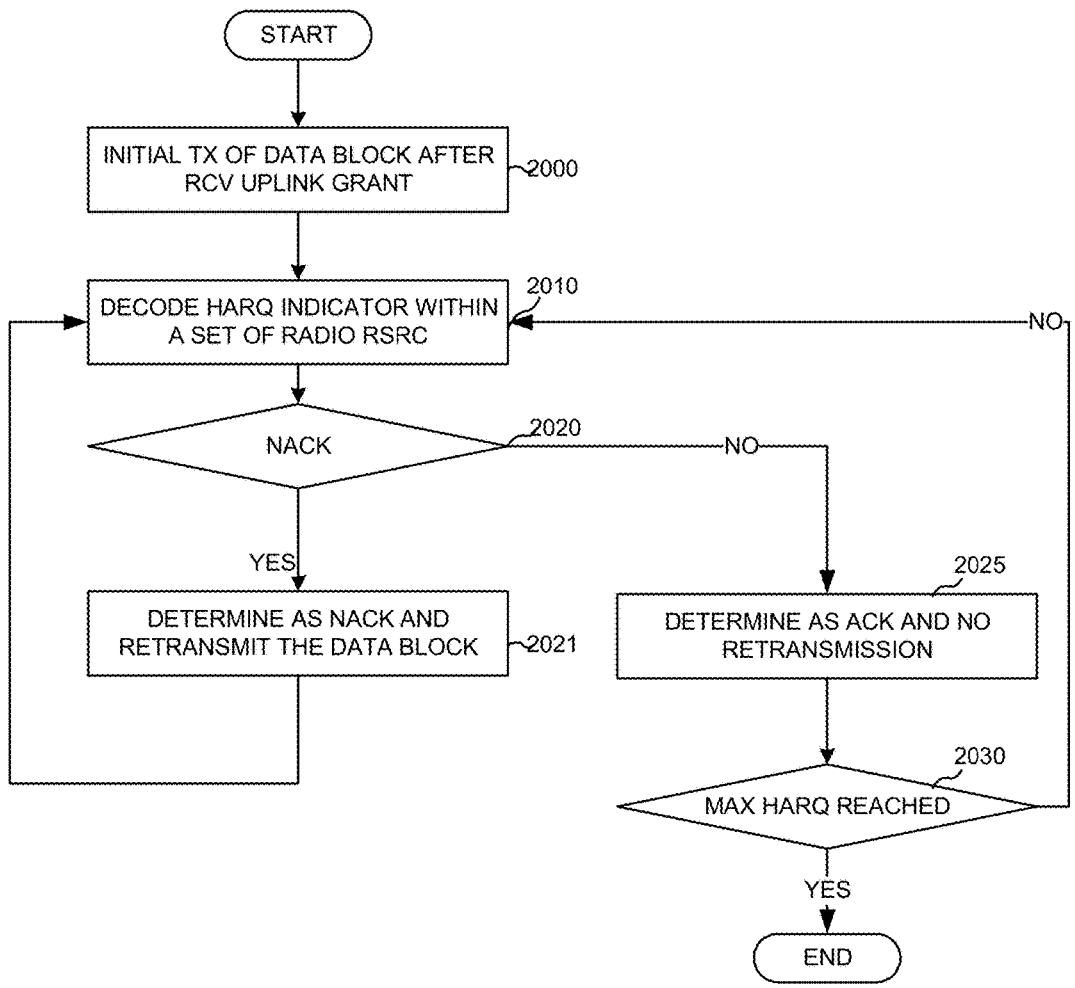
FIG. 20 is an exemplary flow chart of a HARQ receiving procedure where the UE terminates the procedure upon a maximum number of HARQ reached and an ACK is determined.

FIG. 20 is an exemplary flow chart of a HARQ receiving procedure where the UE terminates the procedure upon a maximum number of HARQ reached and an ACK is determined. After an initial transmission of a data block by repeated transmission with a first repetition number (Step 2000), a UE will try to receive and decode a HARQ indicator (Step 2010). Subsequently, a determination of the acknowledgement state is performed, as expressed as Step 2020. If a negative state is determined, a UE will start a retransmission of the data block with a second repetition number (Step 2021). If a positive state is determined, no retransmission is performed (Step 2025). Note that the counter for the HARQ indicator is updated once a received HARQ indicator indicates a positive acknowledgement in Step 2025. However, a UE will further check to receive another HARQ indicator by checking the cumulated number of received positive acknowledgements (Step 2030). If the number of the positive acknowledgements reaches the threshold, the process of this data block transmission ends (Step 2035). Otherwise, the UE will try to receive another HARQ indicator for the transmitted data block.

To further reduce the power consumption at UE side and improve the resource efficiency, a threshold for a repetition number for a data block transmission is specified as $N_{data}^{max}$, which is a maximal repetition number. In one embodiment, the UE should judge whether the maximum repetition number of the data block is reached before starting a new retransmission when an NACK is detected. If the cumulated repetition number, which is the sum of the repetition number for the initial transmission and the repetition number in each retransmission, exceeds the maximum repetition number, the UE will stop retransmitting the data block. Otherwise a new retransmission with a new repetition number will be performed.

Figure 21:
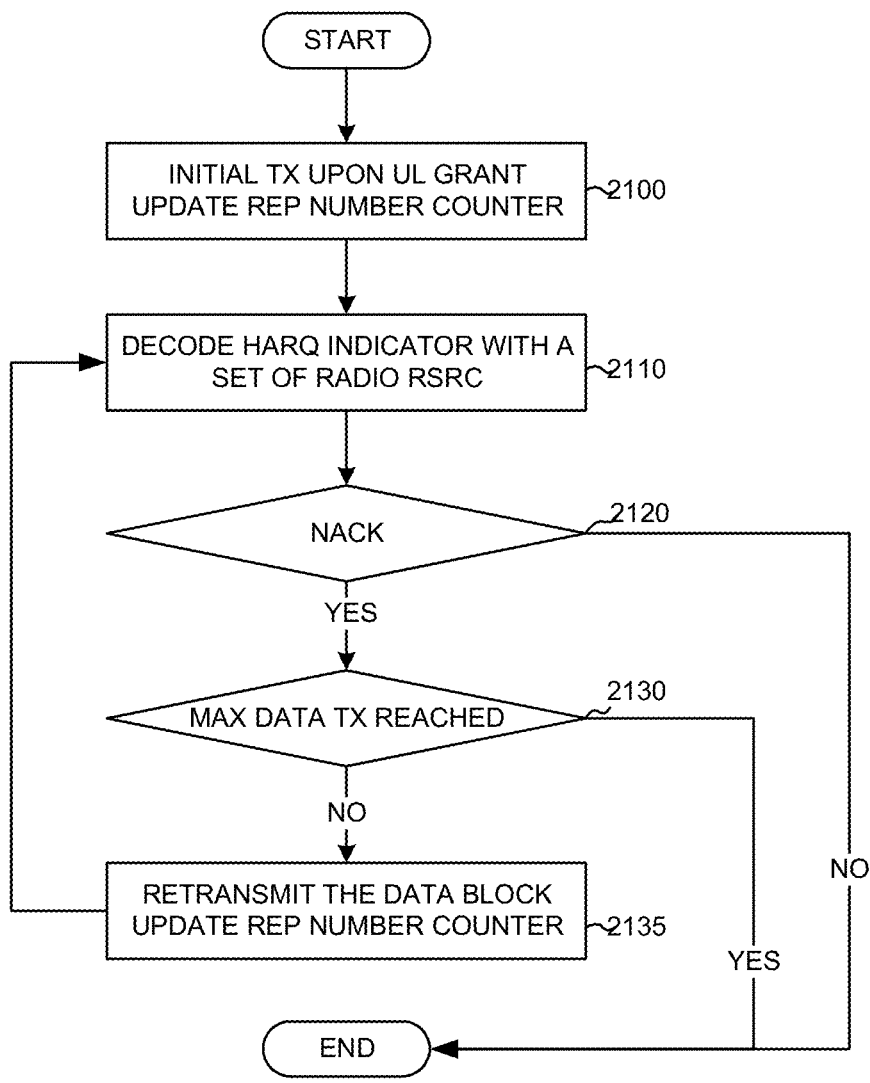
FIG. 21 illustrates an exemplary flow chart of the UE terminating the data transmission upon detecting maximum number of repetition transmission is reached.

FIG. 21 illustrates an exemplary flow chart for the UE to terminate the data transmission upon detecting maximum number of repetition transmission is reached. The UE performs an initial transmission repeatedly and updates the counter for the data block repetition number, after an uplink grant message (Step 2100). Then, the UE will determine the acknowledgement state (Step 2120) from the decoded HARQ indicator (Step 2110). If an ACK is determined, the data block transmission ends. If a NACK is determined, the UE will further check whether the cumulated repetition number of the data block achieves the specified maximal number (Step 2130). If not, a UE will try to receive and decode another HARQ indicator, after performing a retransmission and updating the counter for the data block repetition number (Step 2135). If the cumulated repetition number of the data block is larger than the maximal number, the transmission of this data block finishes and a UE will wait for another uplink grant message (Step 2131).

Figure 22:
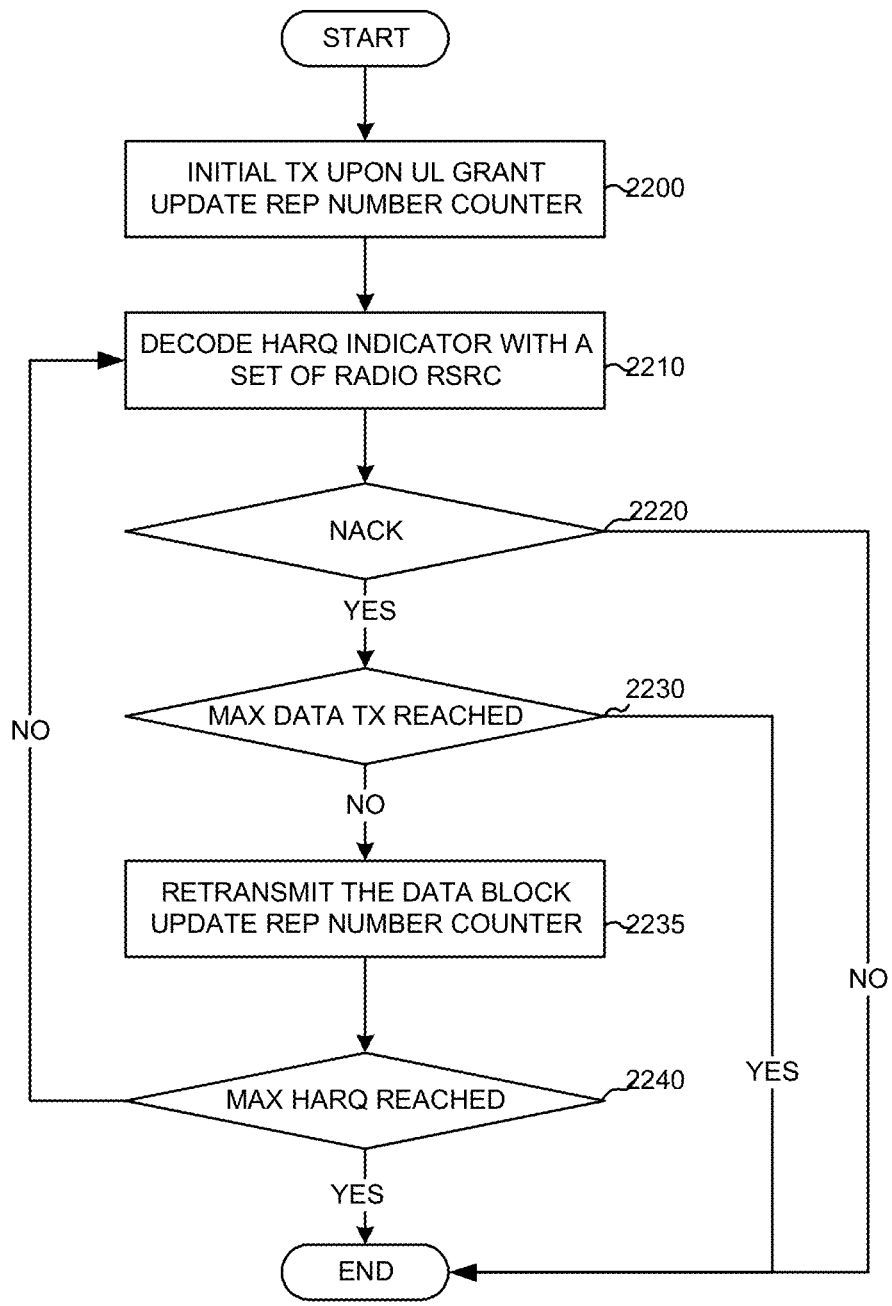
FIG. 22 illustrates an exemplary flow chart of the UE terminating the data transmission upon detecting maximum number of repetition transmission is reached or the maximum numbers of HARQ indicators are received.

FIG. 22 illustrates an exemplary flow chart for the UE to terminate the data transmission upon detecting maximum number of repetition transmission is reached or the maximum numbers of HARQ indicators are received. At Step 2200, the UE performs an initial transmission of a data block repeatedly after receiving an uplink grant message and updates the counter for the data block repetition number correspondingly. Subsequently, a HARQ indicator is received (Step 2210), where the counter for the HARQ indicator number is updated. An ACK/NACK determination is performed (Step 2220). If an ACK is determined, the process of this data block transmission terminates. If a NACK is determined, a comparison between the cumulated repetition number and a maximal number for the data block transmission is performed (Step 2230). The UE will terminate the process of the data block transmission if the cumulated repetition number reaches the maximum number (Step 2231). Otherwise, a retransmission of the data block is performed and the counter for the data block repetition number is updated (Step 2235. The UE will further check whether the cumulated number of HARQ indicator is larger than a threshold number for HARQ indicator (Step 2240). If not, another HARQ indicator will be received and decoded, and the counter for the HARQ indicator is also updated when a HARQ indicator is received (Step 2241). If the cumulated number of HARQ indicator reaches the specified value, the process of this data block transmission terminates.

Figure 23:
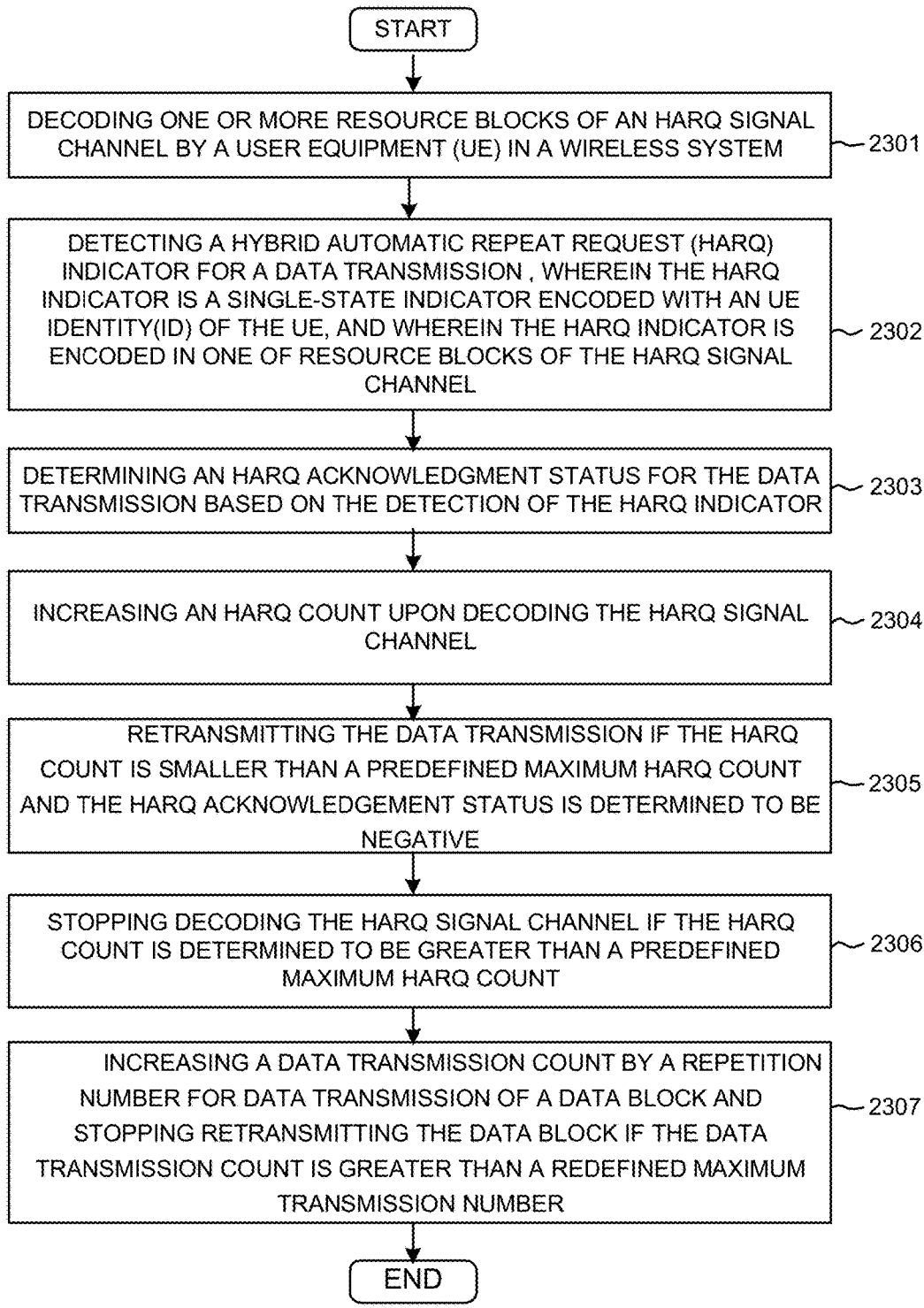
FIG. 23 is an exemplary flow chart for the UE to decode and handle the single-state HARQ in accordance with embodiments of the current invention.

FIG. 23 is an exemplary flow chart for the UE to decode and handle the single-state HARQ in accordance with embodiments of the current invention. At Step 2301, the UE decodes one or more resource blocks in a HARQ indicator channel. At Step 2302, the UE detects a hybrid automatic repeat request (HARQ) indicator for a data transmission, wherein the HARQ indicator is a single-state indicator encoded with a UE identity (ID) of the UE, and wherein the HARQ indicator is encoded in one of resource blocks of the HARQ indicator channel. At Step 2303, the UE determines a HARQ acknowledgment status for the data transmission based on the detection of the HARQ indicator. At Step 2304, the UE increases a HARQ count upon decoding the HARQ indicator channel. At Step 2305, the UE retransmits the data transmission if the HARQ count is smaller than a predefined maximum HARQ count and the HARQ acknowledgement status is determined to be negative. At Step 2306, the UE stops decoding the HARQ indicator channel if the HARQ count is greater than a predefined maximum HARQ count. At Step 2307, the UE increases a data transmission count by a repetition number for data transmission of a data block and stops retransmitting the data block if the data transmission count is greater than a redefined maximum transmission number.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   decoding one or more resource blocks in a HARQ indicator channel by a user equipment (UE) in a wireless communication system;
   detecting a hybrid automatic repeat request (HARQ) indicator for a data transmission, wherein the HARQ indicator is a single-state indicator encoded with a UE identity (ID) of the UE, and wherein the HARQ indicator is encoded in one of resource blocks of the HARQ indicator channel;
   determining a HARQ acknowledgment status for the data transmission based on the detection of the HARQ indicator, wherein the data transmission repeatedly transmits a data block for a first repetition number $N_1$ times, wherein $N_1$ is an integer greater than zero;
   increasing a data transmission count by $N_1$ upon performing the data transmission;
   retransmitting the data block with a second repetition number $N_2$ if the HARQ acknowledgement status is determined to be negative;
   increasing the data transmission count by $N_2$ upon retransmitting the data block; and
   stopping transmitting or retransmitting the data block if the data transmission count is greater than a predefined maximum transmission number.

2. The method of claim 1, wherein the UE ID is an identity sequence configured at a Mobility Management Entity (MME).

3. The method of claim 1, wherein the UE ID is configured by a higher layer.

4. The method of claim 1, wherein the HARQ indicator is generated by scrambling a sequence of coded CRC bits with a subset of the UE ID sequence.

5. The method of claim 4, wherein the HARQ indicator is a common signal for NACK/ACK.

6. The method of claim 1, wherein the HARQ acknowledgment status is determined to be positive if the HARQ indicator is detected.

7. The method of claim 1, wherein the HARQ acknowledgment status is determined to be negative if the HARQ indicator is detected.

8. The method of claim 1, wherein the HARQ indicator is not detected, and wherein one or more of the resource blocks in the HARQ indicator channel is allocated to non-HARQ data transmission.

9. The method of claim 1, wherein the HARQ indicator channel is a UE-specific channel that contains only HARQ indicator resource blocks for the UE.

10. The method of claim 1, wherein the HARQ indicator channel is a group-specific channel that contains HARQ indicator resource blocks for a plurality of UEs.

11. The method of claim 1, wherein the HARQ indicator channel is a cell-specific channel that contains HARQ indicator resource blocks for multiple UEs belonging to the same cell.

12. The method of claim 1, further comprising:
    increasing a HARQ count upon decoding the HARQ indicator channel;
    retransmitting the data transmission if the HARQ count is smaller than a predefined maximum HARQ count and the HARQ acknowledgement status is determined to be negative, and;
    stopping decoding the HARQ indicator channel if the HARQ count is greater than a predefined maximum HARQ count.

13. The method of claim 1, further comprising:
    increasing a HARQ count upon decoding the HARQ indicator channel;
    stopping transmitting or retransmitting the data block if the HARQ count is determined to be greater than a predefined maximum HARQ count.

14. The method of claim 1, wherein the HARQ indicator channel spans over multiple subframes.

15. The method of claim 1, wherein the HARQ indicator channel spans over one subframe.

16. An user equipment (UE) comprising:
    a transceiver that transmits an uplink data transmission to a base station and receives a downlink data transmission from the base station;
    an HAQR decoder that decodes one or more resource blocks of a HARQ indicator channel;
    a HARQ detector that detects a hybrid automatic repeat request (HARQ) indicator for the uplink data transmission, wherein the HARQ indicator is a single-state indicator encoded with a UE identity (ID) of the UE, and wherein the HARQ indicator is encoded in one of resource blocks of the HARQ indicator channel;
    a HARQ handler that determines a HARQ acknowledgment status for the uplink data transmission based on the detection of the HARQ indicator; and
    a transmission counter that increases an transmission count by a repetition number of corresponding data transmission and data retransmissions, wherein each data transmission or retransmission retransmits a data block for a new repetition number of times triggered by a negative HARQ acknowledgment status; and wherein the transmission counter determines if the transmission count is greater than a predefined maximum transmission number after each data transmission or retransmission, and wherein the transmission counter informs the HARQ decoder when the maximum HARQ count is reached such that the HARQ decoder stops decoding the HARQ indicator channel.

17. The UE of claim 16, wherein the HARQ indicator is generated by scrambling a sequence of coded CRC bits with a subset of the UE ID sequence, and wherein the coded CRC bits are common signal for NACK/ACK.

18. The UE of claim 16, wherein the HARQ indicator is a subset sequence of the UE ID sequence.

19. The UE of claim 16, wherein the HARQ indicator is detected if the decoded resource blocks contain the UE ID.

20. The UE of claim 19, wherein the HARQ acknowledgment status is determined to be positive if the HARQ indicator is detected.

21. The UE of claim 19, wherein the HARQ acknowledgment status is determined to be negative if the HARQ indicator is detected.

22. The UE of claim 16, wherein the HARQ indicator channel is selected from a channel group comprising a UE-specific channel that contains only HARQ indicator resource blocks for the UE, a group-specific channel that contains HARQ indicator resource blocks for a plurality of UEs, and a cell-specific channel that contains HARQ indicator resource blocks for multiple UEs of a cell.

23. The UE of claim 16, further comprising:
a HARQ counter that increases a HARQ count upon detecting the HARQ indicator channel, determines if the HARQ count is greater than a predefined maximum HARQ number, and informs the HARQ decoder when the maximum HARQ count is reached such that the HARQ decoder stops decoding the HARQ indicator channel.

* * * * *

UNITED STATES PATENT AND TRADEMARK OFFICE
CERTIFICATE OF CORRECTION

PATENT NO. : 10,411,840 B2
APPLICATION NO. : 15/176274
DATED : September 10, 2019
INVENTOR(S) : Hua-Min Chen et al.

Page 1 of 1

It is certified that error appears in the above-identified patent and that said Letters Patent is hereby corrected as shown below:

On the Title Page

Item [30], reads:
"Jan. 28, 2015 (WO) ..........PCT/CN2015/071721"

Should read:
--Jan. 28, 2014 (WO) ..........PCT/CN2014/071684--

In the Claims

Column 16, Line 52, Claim 16 reads:
"HAQR"

Should read:
--HARQ--

Signed and Sealed this
Nineteenth Day of November, 2019

Andrei Iancu
*Director of the United States Patent and Trademark Office*